United States Patent
Iida et al.

(10) Patent No.: US 10,656,442 B2
(45) Date of Patent: May 19, 2020

(54) SEMICONDUCTOR DEVICE AND METHOD OF MANUFACTURING SAME

(71) Applicant: Renesas Electronics Corporation, Tokyo (JP)

(72) Inventors: Tetsuya Iida, Ibaraki (JP); Yasutaka Nakashiba, Ibaraki (JP); Shinichi Kuwabara, Ibaraki (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/976,912

(22) Filed: May 11, 2018

(65) Prior Publication Data
US 2019/0004342 A1    Jan. 3, 2019

(30) Foreign Application Priority Data
Jun. 29, 2017   (JP) ................................ 2017-127892

(51) Int. Cl.
*G02F 1/01* (2006.01)
*G02F 1/025* (2006.01)

(52) U.S. Cl.
CPC ............ *G02F 1/0147* (2013.01); *G02F 1/025* (2013.01); *G02F 2201/06* (2013.01); *G02F 2202/32* (2013.01); *G02F 2203/21* (2013.01)

(58) Field of Classification Search
None
See application file for complete search history.

(56) References Cited

U.S. PATENT DOCUMENTS

| | | | | |
|---|---|---|---|---|
| 4,970,713 A | * | 11/1990 | Imoto | G02F 1/3132 385/15 |
| 6,122,416 A | * | 9/2000 | Ooba | G02F 1/3132 385/131 |
| 6,408,111 B1 | * | 6/2002 | Doerr | G02F 1/011 385/132 |
| 6,922,422 B2 | * | 7/2005 | Peters | G02B 6/12004 372/34 |

(Continued)

FOREIGN PATENT DOCUMENTS

| JP | 08328049 A | * | 12/1996 | ............. G02F 1/011 |
|---|---|---|---|---|
| JP | 2003084320 A | * | 3/2003 | |

(Continued)

OTHER PUBLICATIONS

Leonardis et al. ("Optical properties of new wide heterogeneous waveguides with thermos optical shifters", Optics Express, vol. 16, No. 26, Dec. 22, 2008, pp. 21333-21338) (Year: 2008).*
Lee et al. ("Analysis of Thermal Vias in High Density Interconnect Technology", Eight IEEE Semi-Therma^TM Symposium, IEEE, pp. 55-61, 1992) (Year: 1992).*
Khan ("Targeted cooling with CVD diamond and micro-channel to meet 3-D IC heat dissipation challenge", IEEE, 2012) (Year: 2012).*

(Continued)

Primary Examiner — Michelle R Connelly
(74) Attorney, Agent, or Firm — Mattingly & Malur, PC

(57) ABSTRACT

In an optical waveguide supplied with electricity by using a heater, miniaturization of the device is achieved by enhancing heat dissipation efficiency and heat resistance. In a modulator including an optical waveguide formed on an insulating film, a first interlayer insulating film that covers the optical waveguide, a heater formed on the first interlayer insulating film, and a second interlayer insulating film that covers the heater, a heat conducting portion adjacent to the optical waveguide and the heater and penetrating the first and second interlayer insulating films is formed.

16 Claims, 9 Drawing Sheets

(56) References Cited

U.S. PATENT DOCUMENTS

| | | |
|---|---|---|
| 8,644,649 B2 | 2/2014 | Meade et al. |
| 9,310,552 B2 | 4/2016 | Meade et al. |
| 9,348,154 B2 | 5/2016 | Hayakawa |
| 2007/0013061 A1* | 1/2007 | Chen .................... H05K 1/0274 257/728 |
| 2008/0273830 A1* | 11/2008 | Chen .................... H05K 1/0274 385/14 |
| 2011/0235962 A1* | 9/2011 | Shubin ............... G02B 6/12007 385/14 |
| 2015/0253510 A1* | 9/2015 | Celo .................... G02B 6/3582 385/14 |
| 2018/0114785 A1* | 4/2018 | Budd .................... G02B 6/4204 |
| 2018/0323575 A1* | 11/2018 | Caer .................... H01S 3/2375 |
| 2019/0235285 A1* | 8/2019 | McGreer ............... G02F 1/0147 |

FOREIGN PATENT DOCUMENTS

| | | | |
|---|---|---|---|
| JP | 2006058858 A | * | 3/2006 |
| JP | 2014-519623 A | | 8/2014 |
| JP | 2015-094781 A | | 5/2015 |
| JP | 2015-519618 A | | 7/2015 |

OTHER PUBLICATIONS

Kawanabe et al. ("Numerical Simulations of High Heat Dissipation Technology in LSI 3-D Packaging Using Carbon Nanotube Through Silicon Via (CNT-TSV) and Thermal Interface Material (CNT-TIM)", IEEE, 2013) (Year: 2013).*

* cited by examiner

SEMICONDUCTOR DEVICE AND METHOD OF MANUFACTURING SAME

CROSS-REFERENCE TO RELATED APPLICATIONS

The disclosure of Japanese Patent Application No. 2017-127892 filed on Jun. 29, 2017 including the specification, drawings, and abstract is incorporated herein by reference in its entirety.

BACKGROUND

The present invention relates to a semiconductor device and a method of manufacturing the same, in particular, to a technique effective when applied to a semiconductor device that performs optical communication and a method of manufacturing the same.

A silicon photonic device is known as a semiconductor device that performs optical communication. Examples of a method of modulating optical signals by means of the silicon photonic device include a method of making using a carrier plasma effect based on the dependence of the refractive index of an optical waveguide on a carrier density and a method of making using a thermo-optical effect based on dependence of the refractive index on a temperature.

Patent Document 1 (Japanese Translation of PCT International Application Publication No. 2015-519618) describes provision of a heat insulation region in the vicinity of a heating device in a photonic integrated circuit.

Patent Document 2 (Japanese Translation of PCT International Application Publication No. 2014-519623) describes an optical resonator having different resonant temperatures.

Patent Document 3 (Japanese Unexamined Patent Application Publication No. 2015-94781) describes a plurality of optical resonators cascaded.

PATENT DOCUMENTS

[Patent Document 1] Japanese Translation of PCT International Application Publication No. 2015-519618
[Patent Document 2] Japanese Translation of PCT International Application Publication No. 2014-519623
[Patent Document 3] Japanese Unexamined Patent Application Publication No. 2015-94781

SUMMARY

When a thermal change in refractive index is caused in a silicon photonic device in order to modulate the intensity or phase of an optical signal, an optical waveguide is supplied with heat by a heater. During modulation, the optical waveguide is supplied, from resistance (heater), with intense heat which is not supplied continuously in a conventional process of manufacturing a semiconductor device. Such a silicon photonic device is required to have increased heat resistance. An increase in the distance between modulators is thought as a means for preventing thermal interference therebetween, but this leads to a problem, that is, an increase in the area of a semiconductor device. A silicon photonic device that performs optical modulation using heat is therefore required to have improved thermal conduction control accuracy and increased heat dissipation efficiency.

Another object and novel features will be apparent from the description herein and accompanying drawings.

Among the embodiments disclosed herein, representative ones will next be outlined simply.

In one embodiment, there is provided a semiconductor device having an optical waveguide formed on a substrate via an insulating film and made of a semiconductor film, an interlayer insulating film that covers the optical waveguide on the insulating film, a heater formed in the interlayer insulating film and just above the optical waveguide while being separated from the optical waveguide, and a heat conducting portion adjacent to the optical waveguide and the heater via the interlayer insulating film and penetrating the interlayer insulating film.

According to the embodiment disclosed herein, a semiconductor device having improved performance can be provided. In particular, a silicon photonic device having improved heat dissipation performance can be provided.

DETAILED DESCRIPTION

Figure 1:
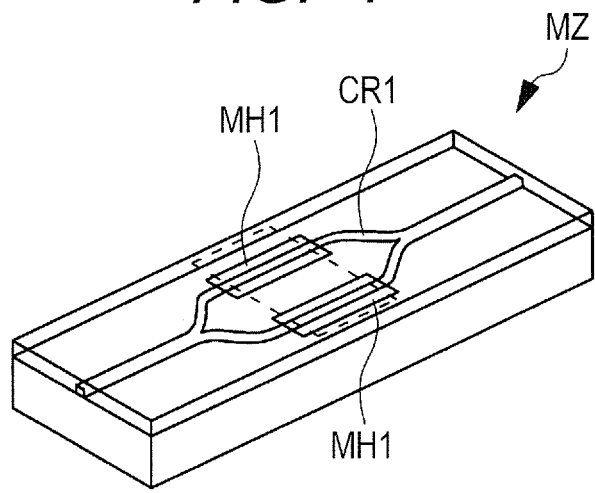
FIG. 1 is a schematic perspective view showing a semiconductor device of First Embodiment of the invention.

In the below-described embodiments, a description will be made after divided into a plurality of sections or embodiments if necessary for the sake of convenience. These sections or embodiments are not independent from each other unless otherwise particularly specified, but one of them may be a modification example, details, a complementary description, or the like of a part or whole of the other one. In the below-described embodiments, when a reference is made to the number or the like (including the number, value, amount, range, or the like) of a component, the number is not limited to a specific number but may be more or less than the specific number, unless otherwise particularly specified or principally apparent that the number is limited to the specific number.

Further, it is needless to say that in the below-described embodiments, the constituent component (including component step or the like) is not always essential unless otherwise particularly specified or principally apparent that it is essential. Still further, in the below-described embodiments, when a reference is made to the shape, positional relationship, or the like of the constituent component, a component substantially approximate or analogous thereto in shape or the like is also embraced unless otherwise particularly specified or principally apparent that it is not. This also applies to the above-described number and range.

The embodiments will next be described in detail referring to some drawings. In all the drawings for describing the embodiments, members having the same function will be identified by the same reference numerals and overlapping descriptions will be omitted. In the below-described embodiments, a description on the same or similar portions is not repeated in principle unless otherwise particularly necessary. Even plan views, perspective view, or the like are sometimes hatched to facilitate understanding of the configuration.

First Embodiment

The semiconductor device of the present embodiment relates to a modulator which is a silicon photonic device. It is mainly characterized by that when modulation is performed by heating an optical waveguide with a heater, heat is radiated from a heat conducting portion formed in the vicinity of the heater and the optical waveguide.

The term "silicon photonics" relates to the technology of a photonic system using Si (silicon) as an optical medium. When signals are transmitted using light, Si can be used for guiding the flow of light. Si is a material that allows penetration of infrared light having a wavelength exceeding about 1.1 micrometer. Si has a refractive index as high as about 3.5. A severe optical limitation attributable to this high refractive index makes it possible to provide a minute optical waveguide having a cross-sectional area of, for example, several hundred $nm^2$. The silicon photonic device can be produced using the existing semiconductor manufacturing technology. Since communication using a silicon photonic device is power saving, use of it for the communication in a server or between servers can save the power drastically.

As a method of modulating the intensity or phase of optical signals, there are a method of using a carrier plasma effect resulting from the dependence of the refractive index of an optical waveguide on a carrier density and a method of using a thermos-chemical effect resulting from the dependence of this refractive index on a temperature. In the present embodiment, described is, among silicon photonic devices which are semiconductor devices, a modulator that carries out modulation of light by making use of the thermo-optical effect.

<Structure of Semiconductor Device>

Figure 2:
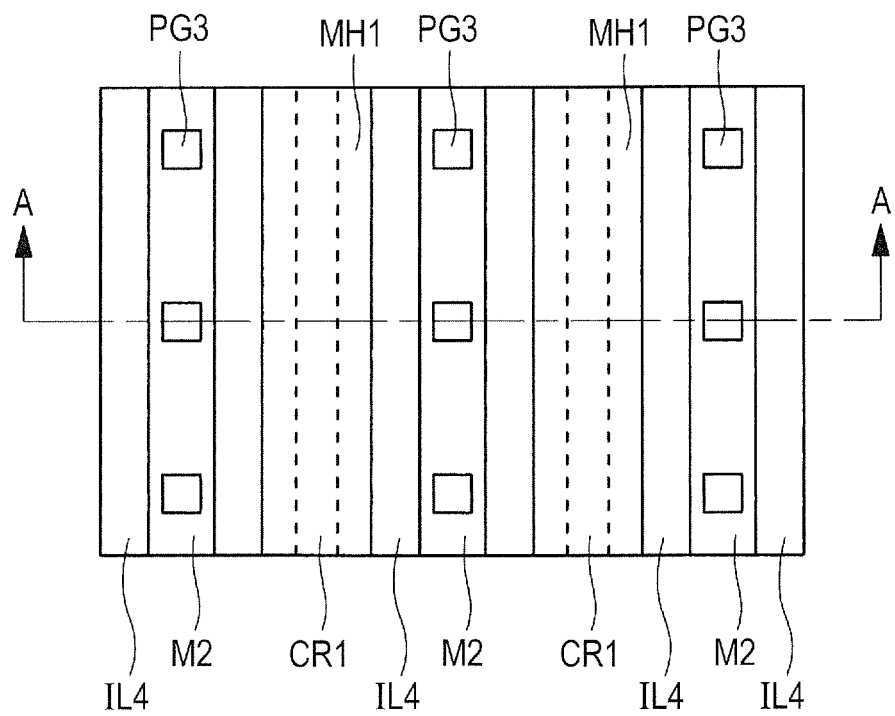
FIG. 2 is a plan view showing the semiconductor device of First Embodiment of the invention.
Figure 3:
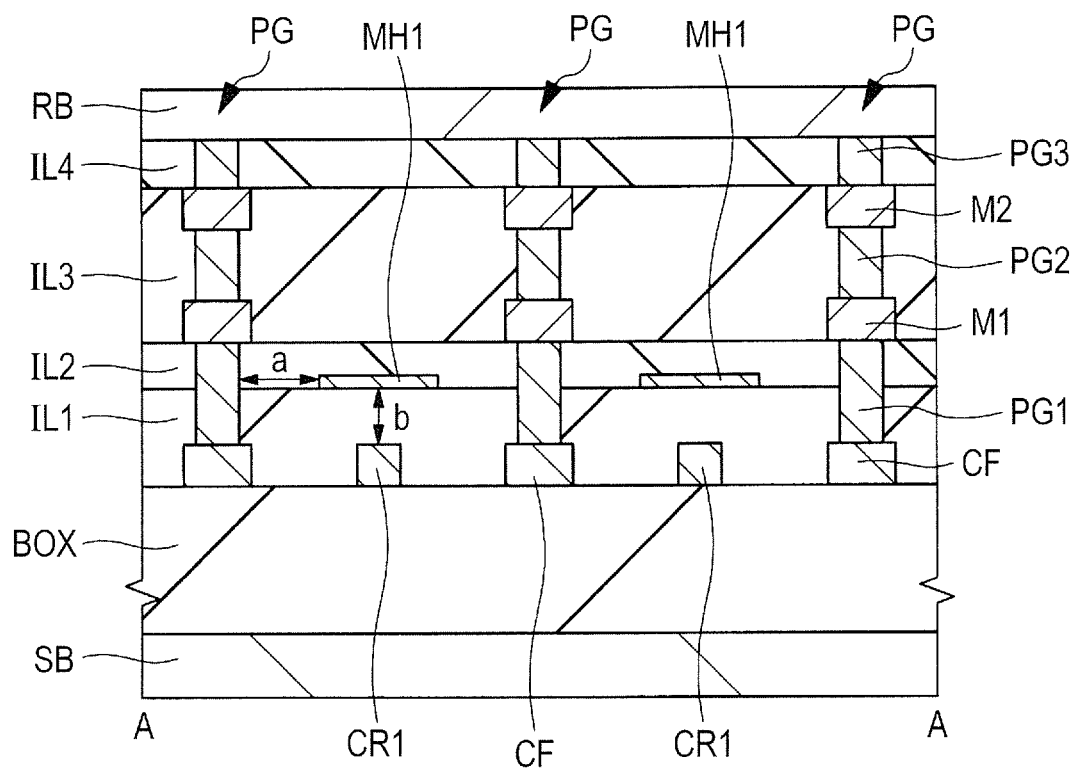
FIG. 3 is a cross-sectional view taken along the line A-A of FIG. 2.

The structure of the semiconductor device of First Embodiment will hereinafter be described referring to FIGS. 1, 2, and 3. FIG. 1 is a schematic perspective view showing the semiconductor device of the present embodiment. FIG. 2 is a plan view showing the semiconductor device of the present embodiment. In the plan view of FIG. 2, the semiconductor device at a position surrounded with the broken line in FIG. 1 is shown. FIG. 3 is a cross-sectional view showing the semiconductor device of the present embodiment. In FIG. 3, a cross-section taken along the line A-A of FIG. 2 is shown.

As shown in FIG. 1, the semiconductor device of the present embodiment is a silicon photonic device including a modulator MZ. FIG. 1 shows the modulator MZ comprised of a stack of a substrate, a buried oxide film on the substrate, and an interlayer insulating film and an optical waveguide CR1 formed in the stack. The modulator MZ includes therein the optical waveguide (core) CR1 made of Si (silicon). The modulator MZ of the present embodiment is a so-called Mach-Zehnder optical modulator. The optical waveguide CR1 is comprised of a first optical waveguide extending in a first direction, that is, a direction along the substrate, a second optical waveguide and a third optical waveguide branched from the first optical waveguide, and a fourth optical waveguide. The second optical waveguide and the third optical waveguide are joined and coupled into the fourth optical waveguide. In other words, the second optical waveguide and the third optical waveguide are coupled in parallel between the first optical waveguide and the fourth optical waveguide.

The second optical waveguide and the third optical waveguide each have a portion extending in the first direction and they are aligned in a second direction which is a direction orthogonal to the first direction and running along the upper surface of the substrate. This means that these portions are placed in parallel to each other. The fourth optical waveguide extends in the first direction. The first optical waveguide is a waveguide which light input to the modulator MZ passes. After the input light passes the first optical waveguide, it is branched into the second optical waveguide and the third optical waveguide. Then, the phase of the light passing the second optical waveguide and the phase of the light passing the third optical waveguide are changed relatively, depending on a difference in the refractive index between the second optical waveguide and the third optical waveguide. They are then joined again at the fourth optical waveguide to change the intensity of the output light by interference.

The light input to the modulator MZ is that from a coherent light source such as laser (for example, hybrid silicon laser or gallium arsenide laser). Although not shown here, the output source of light input to the first optical waveguide may be coupled to the end portion of the first optical waveguide in the modulator MZ. Similarly, an apparatus for receiving the light output from the fourth optical waveguide and converting it into an electric signal may be coupled to the end portion of the fourth optical waveguide in the modulator MZ. It is also possible that there are two optical signal input portions and respective optical waveguides coupled to these two input portions may be coupled to the first optical waveguide. The fourth optical waveguide may be branched into two again at the end portion thereof. In this case, respective end portions of the two optical waveguides branched from the fourth optical waveguide may serve as an output portion.

The modulator MZ is a device of changing the phase of an optical signal that transmits the signal of "1" or "0" in the form of "ON" or "OFF" and thereby changing the signal "1" into "0" or the signal "0" into "1". In short, the modulator MZ operates as a switching element. Modulation of the phase is carried out in either the second optical waveguide or the third optical waveguide. More specifically, in either the second optical waveguide or the third optical waveguide, the optical waveguide CR1 is supplied with heat from the heater MH1 in the modulator MZ to cause a change in the refractive index of the optical waveguide CR1. Then, an optical signal passes through the optical waveguide CR1 having a changed refractive index and at this time, a change in the phase of the optical signal occurs. Thus, modulation is performed. The present embodiment mainly relates to the structure of the modulator MZ in the vicinity of the second optical waveguide and the third optical waveguide.

FIGS. 2 and 3 show the plan view layout and cross-sectional view, respectively, each showing the second optical waveguide and third optical waveguide. As shown in FIG. 2, two optical waveguides CR1 including the second optical waveguide and third optical waveguide are arranged in parallel to each other and extend in the first direction. As shown in FIGS. 2 and 3, each of the optical waveguides CR1 has, right thereabove, a heater (modulation heater) MH1 extending in the first direction along each of the optical waveguides CR1. In FIG. 2, the outline of the optical waveguide CR1 below the heater MH1 is shown by a broken line. A wiring M2 shown in FIG. 2 has therebelow a wiring M1 and a semiconductor film CF (refer to FIG. 3) having a layout similar to that of the wiring M2. A plug PG3 shown in FIG. 2 has therebelow plugs PG1 and PG2 (refer to FIG. 3) having a layout similar to that of the plug PG3.

As shown in FIG. 3, the modulator of the present embodiment which is a silicon photonic device has a semiconductor substrate SB made of, for example, Si (silicon), and an insulating film BOX formed on the semiconductor substrate SB and covering the upper surface of the semiconductor substrate SB. The insulating film BOX is a buried oxide (BOX) film and is made of, for example, a silicon oxide film. The insulating film BOX has two optical waveguides CR1 thereon and they are in contact with the upper surface of the insulating film BOX. Each of the optical waveguides CR1 is made of, for example, Si. The optical waveguides CR1 have, for example, a rectangular cross-section. The optical waveguides CR1 have a cross-sectional area of, for example, several hundred nm$^2$. The optical waveguides CR1 have a height of, for example, from 200 nm to 400 nm. Here, after heating of the optical waveguides CR1, the optical waveguides CR1 are brought into contact with the insulating film BOX in order to dissipate the heat of the optical waveguides CR1 to the side of the semiconductor substrate SB via the insulating film BOX.

The insulating film BOX has thereon an interlayer insulating film IL1 to cover the upper surface and side surface of the optical waveguide CR1. The interlayer insulating film IL1 has thereon two heaters MH1. One optical waveguide CR1 has, right thereabove, one heater MH1. This means that the optical waveguide CR1 and the heater MH1 right above the optical waveguide CR1 have therebetween the interlayer insulating film IL1. Similar to the optical waveguide CR1, the heater MH1 extends in the first direction. The heater MH1 has, in the second direction, a width greater than that of the optical waveguide CR1. This means that the short-direction width of the heater MH1 is greater than the short-direction width of the optical waveguide CR1 right below the heater MH1. In the second direction, therefore, the entire upper surface of the optical waveguide CR1 is covered with the heater MH1.

The heater MH1 is a resistor made of, for example, Ti (titanium), or TiN (titanium nitride) and by applying an electric current to the heater MH1, the heater MH1 can be heated to 100° C. or more. Modulation is performed by heating the heater MH1, increasing the temperature of the optical waveguide CR1 via the interlayer insulating film ILL and thereby changing the refractive index of the optical waveguide CR1.

The interlayer insulating film IL1 has thereon an interlayer insulating film IL2 that covers the heater MH1. The interlayer insulating film IL2 has thereon interlayer insulating films IL3 and IL4 which are stacked in order of mention. The interlayer insulating films IL1 to IL4 are each made of, for example, a silicon oxide film. The interlayer insulating films IL1 to IL4 each have a planarized upper surface.

The main characteristic of the semiconductor device of the present embodiment is that it is equipped with a heat conducting portion (electroconductive portion) PG penetrating the stacked film comprised of the interlayer insulating films IL1 to IL4 from the upper surface to the lower surface thereof and adjacent to the optical waveguide CR1. The heat conducting portion PG is a heat conductor portion for cooling the optical waveguide CR1 and the interlayer insulating films IL1 to IL4 having a temperature increased by modulation operation, preventing thermal interference between the optical waveguides CR1, and radiating heat. The heat conducting portion PG is comprised of a semiconductor film CF having an upper surface and a side surface covered with the interlayer insulating film IL1 and formed in contact with the upper surface of the insulating film BOX at a position adjacent to the optical waveguide CR1, plugs (vias) PG1 to PG3 formed right above the semiconductor film CF, and wirings M1 and M2. The position of the upper surface of the semiconductor film CF is as high as that of, for example, the upper surface of the optical waveguide CR1 and lower than that of the upper surface of the interlayer insulating film ILL The heat conducting portion PG has a thermal conductivity greater than that of any of the interlayer insulating films IL1 to IL4 and the insulating film BOX.

The heat conducting portion PG does not configure an electric circuit and is therefore electrically floating. This means that different from a semiconductor element such as laser diode or a plug that supplies a potential to the optical waveguide CR2 (refer to FIG. 11) having a p-type semiconductor region and an n-type semiconductor region which will be described later in Second Embodiment, the heat conducting portion PG functions neither as a voltage application path nor as a current path.

The semiconductor film CF has an upper surface to which the plug PG1 penetrating the interlayer insulating films IL1 and IL2 is coupled. The plug PG1 has an upper surface planarized to have a height equal to that of the upper surface of the interlayer insulating film IL2. The plug PG1 is adjacent to the heater MH1 in the second direction. This means that the heater MH1 is placed at a height between the upper surface and the lower surface of the plug PG1. Each of a plurality of the plugs PG1 and the interlayer insulating film IL2 have thereon wirings M1 extending in the first direction and coupled to the upper surface of the plug PG1.

A wiring trench formed in the upper surface of the interlayer insulating film IL3 right above the wiring M1 has a buried wiring M2 extending in the first direction. The wiring M2 has an upper surface planarized to have a height equal to that of the upper surface of the interlayer insulating film IL3. The wirings M1 and M2 overlapping with each other in plan view have therebetween a plurality of plugs PG2 coupled to the lower surface of the wiring M2 and the upper surface of the wiring M1 and penetrating the interlayer insulating film IL3. The wiring M2 has an upper surface to which a plurality of plugs PG3 penetrating the interlayer insulating film IL4 from the upper surface to the lower surface thereof is coupled. The plugs PG3 have a height planarized to have a height equal to that of the upper surface of the interlayer insulating film IL4.

The plugs PG1 to PG3 are mainly made of, for example, W (tungsten) or Cu (copper). As the heat conducting portion configuring the plugs PG1 to PG3, a barrier conductor film that covers the side surface of the W (tungsten) film or the Cu (copper) film may be formed. As the barrier conductor film, a film containing, for example, Ta (tantalum) or Ti (titanium) is used. The wirings M1 and M2 are mainly made of, for example, Cu (copper) or Al (aluminum). Here, the wiring M1 on the flat interlayer insulating film IL2 is made of an Al (aluminum) film and the wiring M2 buried in the upper surface of the interlayer insulating film IL3 is made of a Cu (copper) film.

None of the plugs PG1 to PG3 extends in plan view and they have a columnar structure. A plurality of each of them is placed in the first direction so as to run along the extending direction of the optical waveguide CR1. The semiconductor film CF and the wirings M1 and M2 extend in the first direction. The heat conducting portions PG are placed so as to sandwich therebetween each optical waveguide CR1 in the second direction (the short direction of the optical waveguide CR1). In other words, the optical waveguide CR1 has, on both sides thereof in the second direction, the heat conducting portion PG. The heat conducting portion PG is separated from the optical waveguide CR1 and the heater MH1 and the interlayer insulating film IL1 or IL2 is present between the heat conducting portion PG and the optical waveguide CR1 or the heater MH1.

As shown in FIG. 3, each of the interlayer insulating film IL4 and the plug PG3 is covered, at the upper surface thereof, with a heat radiation plate (heat radiator, heat radiation fin, electroconductive film, or metal film) RB. The heat radiation plate RB is coupled to the upper surface of the plug PG3. The heat radiation plate RB described herein is formed on the entire upper surface of the modulator to cover therewith both the optical waveguide CR1 and the heater MH1 in plan view. A heat radiation efficiency can be enhanced because in plan view, the heat radiation plate RB covers the optical waveguide CR1 and the heater MH1 therewith and thereby covers the entire upper surface of the modulator. The heat radiation plate RB is mainly made of, for example, Cu (copper) or Al (aluminum). The heat radiation plate RB has a role of releasing the heat transmitted from the heat conducting portion PG to the outside of the semiconductor device.

The distance (b) between the optical waveguide CR1 and the heater MH1 right above the optical waveguide CR1 in a direction perpendicular (perpendicular direction or longitudinal direction) to the main surface of the semiconductor substrate SB or the upper surface of the insulating film BOX is smaller than the distance (a) between the heater MH1 and the heat conducting portion PG in the second direction. In other words, the shortest distance (a) between the heater MH1 and the plug PG1 is greater than the shortest distance (b) between the optical waveguide CR1 and the heater MH1, because when the distance (a) is not greater than the distance (b), even heating of the heater MH1 to supply the optical waveguide CR1 with heat transmits the heat to the plug PG1 prior to the optical waveguide CR1 and cannot heat the optical waveguide CR1.

In this case, a problem, that is, a failure in modulation with a modulator or retardation of a thermal response rate using the heater MH1 occurs. The term "thermal response" as used herein means a rate (time) from the start of heating of the heater MH1 while the optical waveguide CR1 is not supplied with heat until the optical waveguide CR1 acquires a desired refractive index, or a rate (time) from the time when heating of the heater MH1 is stopped until the optical waveguide CR1 restores the original refractive index. In short, the term "thermal response" means an ON/OFF switching rate by modulation.

In the present embodiment, therefore, the failure in modulation with a modulator is prevented and the thermal response rate at the time of changing the refractive index of the optical waveguide CR1 is increased by making the distance (a) twice or more the distance (b). In particular, by setting the distance (a) at 1 μm or more, insufficient power supply to the optical waveguide CR1 due to excessive dissipation of the heat of the heater MH1 from the heat conducting portion PG can be prevented. From the standpoint of radiating heat sufficiently via the heat conducting portion PG, the distance (a) is 7 μm or less.

The heater MH1 cannot be brought into contact with the optical waveguide CR1 for efficiently transmitting the heat of the heater MH1 to the optical waveguide CR1. In addition, it is difficult to make the distance (b) smaller than several hundred nm to 500 nmm, because there is a fear that light passing the optical waveguide CR1 is reflected and scattered by a metal film (heater) near the optical waveguide CR1 to attenuate the light in the optical waveguide CR1. The optical waveguide CR1 and the heater MH1 are therefore placed with a predetermined distance provided therebetween. Here, the optical waveguide CR1 and the heater MH1 have therebetween the interlayer insulating film IL1 having a thickness of 0.5 μm or more so that the distance (a) greater by twice or more the distance (b) is 1 μm or more.

<Method of Manufacturing Semiconductor Device>

A method of manufacturing the semiconductor device of the present embodiment will hereinafter be described referring to FIGS. 4 to 10. FIGS. 4 to 10 are cross-sectional views of the semiconductor device of the present embodiment during manufacturing steps thereof.

Figure 4:
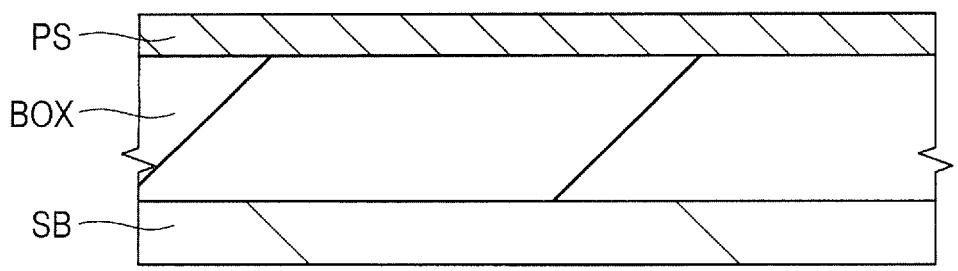
FIG. 4 is a cross-sectional view of the semiconductor device of First Embodiment of the invention during a manufacturing step thereof.

First, as shown in FIG. 4, a SOI (silicon on insulator) substrate is provided, which is a stacked substrate comprised of a semiconductor substrate SB, an insulating film BOX on the semiconductor substrate SB, and a semiconductor film (SOI layer) PS on the insulating film BOX. The semiconductor substrate SB and the semiconductor film PS are each made of, for example, a Si (silicon) film and the insulating film BOX is made of, for example, a silicon oxide film.

Figure 5:
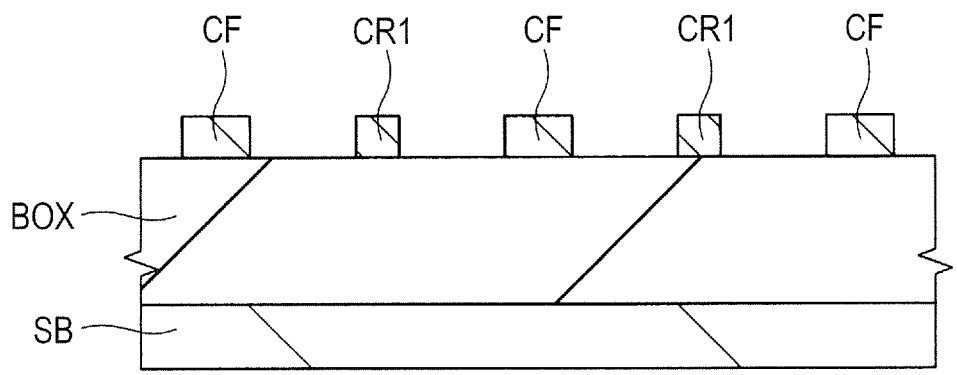
FIG. 5 is a cross-sectional view of the semiconductor device during a manufacturing step following that of FIG. 4.

Next, as shown in FIG. 5, the semiconductor film PS is processed using photolithography and etching to expose portions of the upper surface of the insulating film BOX to form, side by side in the second direction, two optical waveguides CR1 extending in the first direction and made of the semiconductor film PS and further form, side by side in the second direction, a plurality of the patterns of the semiconductor film CF extending in the first direction and made of the semiconductor film PS. Here, the optical waveguide CR1 is formed as a partially branched pattern having a first optical waveguide, a second optical waveguide, a third optical waveguide, and a fourth optical waveguide as shown in FIG. 1. FIG. 5 shows the optical waveguides CR1 which are the second optical waveguide and the third optical waveguide, respectively. Each of the optical waveguides CR1 is sandwiched, in the second direction, by the plurality of semiconductor films CF. Here, the optical waveguides CR1 adjacent to each other have therebetween one of the semiconductor films CF.

Figure 6:
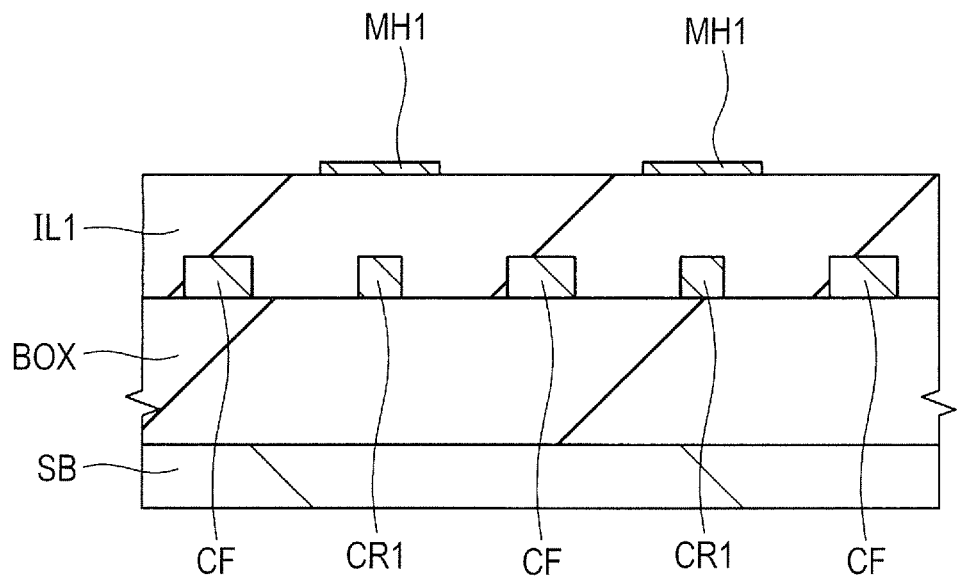
FIG. 6 is a cross-sectional view of the semiconductor device during a manufacturing step following that of FIG. 5.

Next, as shown in FIG. 6, an interlayer insulating film IL1 that covers the optical waveguides CR1 and the semiconductor films CF is formed on the insulating film BOX using, for example, CVD (chemical vapor deposition). The interlayer insulating film IL1 is made of, for example, a silicon oxide film. Then, the upper surface of the interlayer insulating film IL1 is planarized using, for example, CMP (chemical mechanical polishing).

Then, an electro-conductive film (metal film) is formed on the interlayer insulating film ILL for example, by sputtering. This electro-conductive film is made of, for example, Ti (titanium) or TiN (titanium nitride). Then, the electro-conductive film is processed by photolithography and etching to expose portions of the upper surface of the interlayer insulating film IL1 to form two heaters MH1 which are resistors made of the electro-conductive film. These heaters MH1 each extend in the first direction right above the optical waveguide CR1. Each of the heaters MH1 does not overlap with the semiconductor film CF in plan view.

Figure 7:
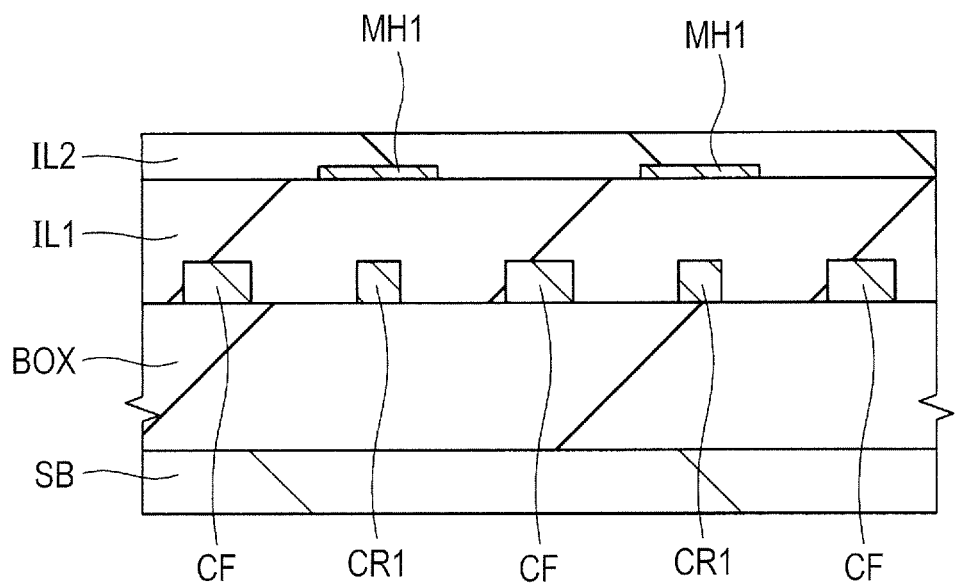
FIG. 7 is a cross-sectional view of the semiconductor device during a manufacturing step following that of FIG. 6.

Next, as shown in FIG. 7, an interlayer insulating film IL2 that covers the heaters MH1 is formed on the interlayer insulating film ILL for example, by CVD. The interlayer insulating film IL2 is made of, for example, a silicon oxide film. Then, the upper surface of the interlayer insulating film IL2 is planarized using, for example, CMP.

Figure 8:
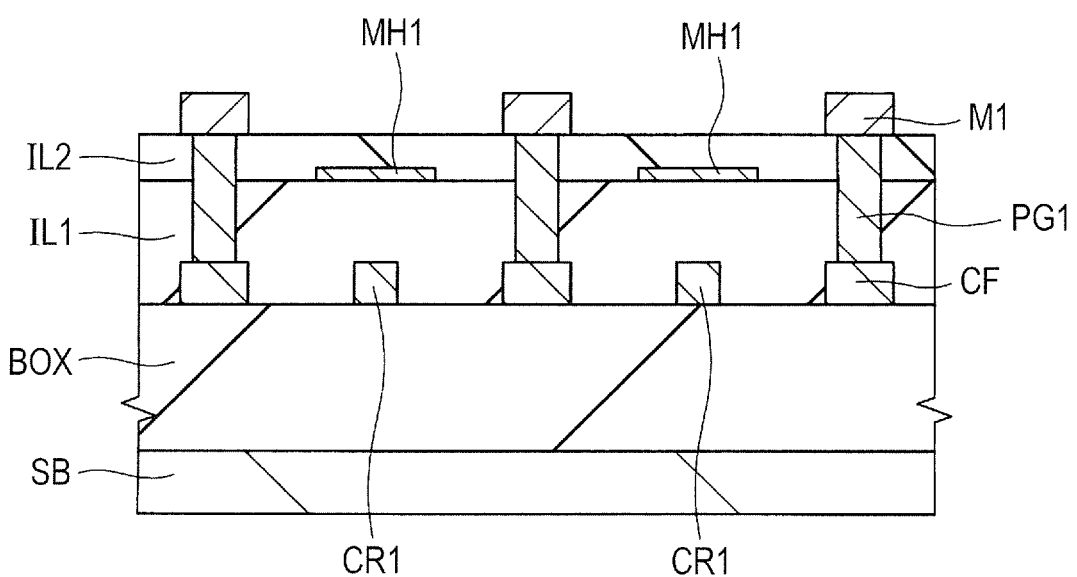
FIG. 8 is a cross-sectional view of the semiconductor device during a manufacturing step following that of FIG. 7.

Next, as shown in FIG. 8, a plurality of coupling holes that penetrate the interlayer insulating films IL1 and IL2 and expose the upper surface of the semiconductor films CF is formed. From the lower surface of each of the coupling holes, only a portion of the upper surface of the semiconductor films CF is exposed. Then, a metal film is formed on the interlayer insulating film IL2 to completely fill each of the coupling holes with the metal film. The metal film is mainly made of, for example, W (tungsten) or Cu (copper). Then, the metal film on the interlayer insulating film IL2 is removed using, for example, CMP to form a plug PG1 left in each of the coupling holes and made of the metal film.

Then, a metal film is formed on the plug PG1 and the interlayer insulating film IL2, for example, by sputtering. The metal film is made of, for example, an Al (aluminum) film. The metal film is then processed using photolithography and etching to expose portions of the upper surface of the interlayer insulating film IL2 to form a wiring M1 extending in the first direction and made of the metal film coupled to the upper surface of the plurality of plugs PG1.

Figure 9:
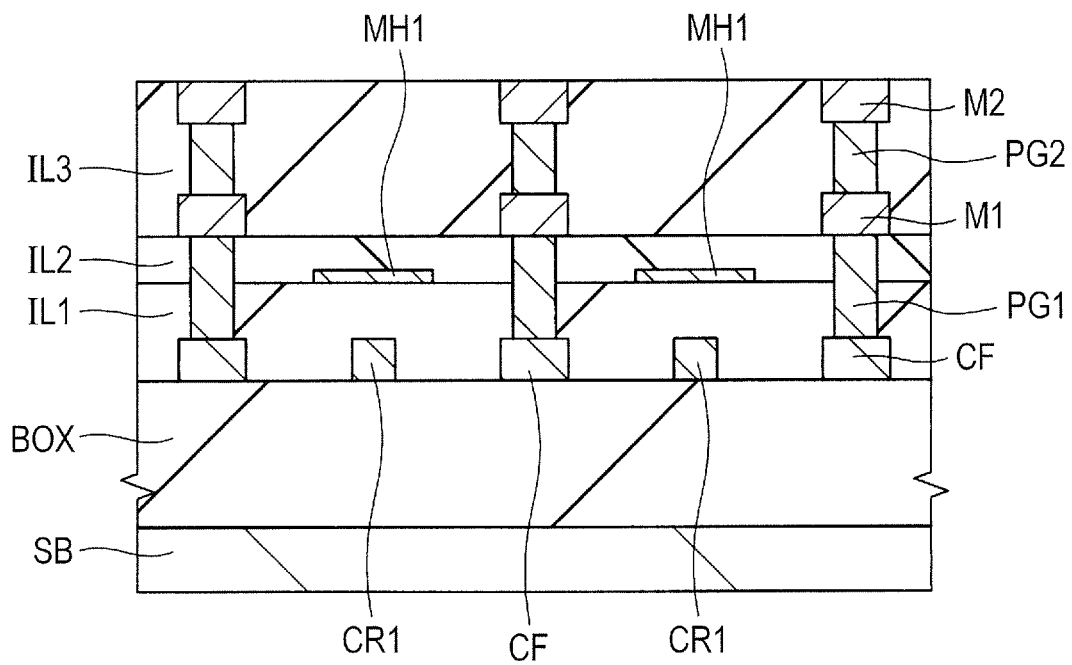
FIG. 9 is a cross-sectional view of the semiconductor device during a manufacturing step following that of FIG. 8.

Next, as shown in FIG. 9, an interlayer insulating film IL3 that covers the wiring M1 is formed on the interlayer insulating film IL2, for example, by CVD. The interlayer insulating film IL3 is made of, for example, a silicon oxide film. Then, the upper surface of the interlayer insulating film IL3 is planarized using, for example, CMP.

Then, a wiring trench not reaching the upper surface of the wiring M1 is formed right above the wiring M1 and in the upper surface of the interlayer insulating film IL3 by photolithography and dry etching. A coupling hole penetrating the interlayer insulating film IL3 and exposing the upper surface of the wiring M1 is then formed at the lower surface of the wiring trench. A metal film is formed on the interlayer insulating film IL3 to completely fill the wiring trench and the coupling hole. The metal film is mainly made of, for example, Cu (copper). The metal film on the interlayer insulating film IL3 is then removed using, for example, CMP to form a plug PG2 made of the metal film left in each of the coupling holes and the wiring M2 made of the metal film with which the wiring trench is filled. In short, the wiring M2 and the plug (via) PG2 below the wiring M2 are both formed using so-called dual damascene process.

Figure 10:
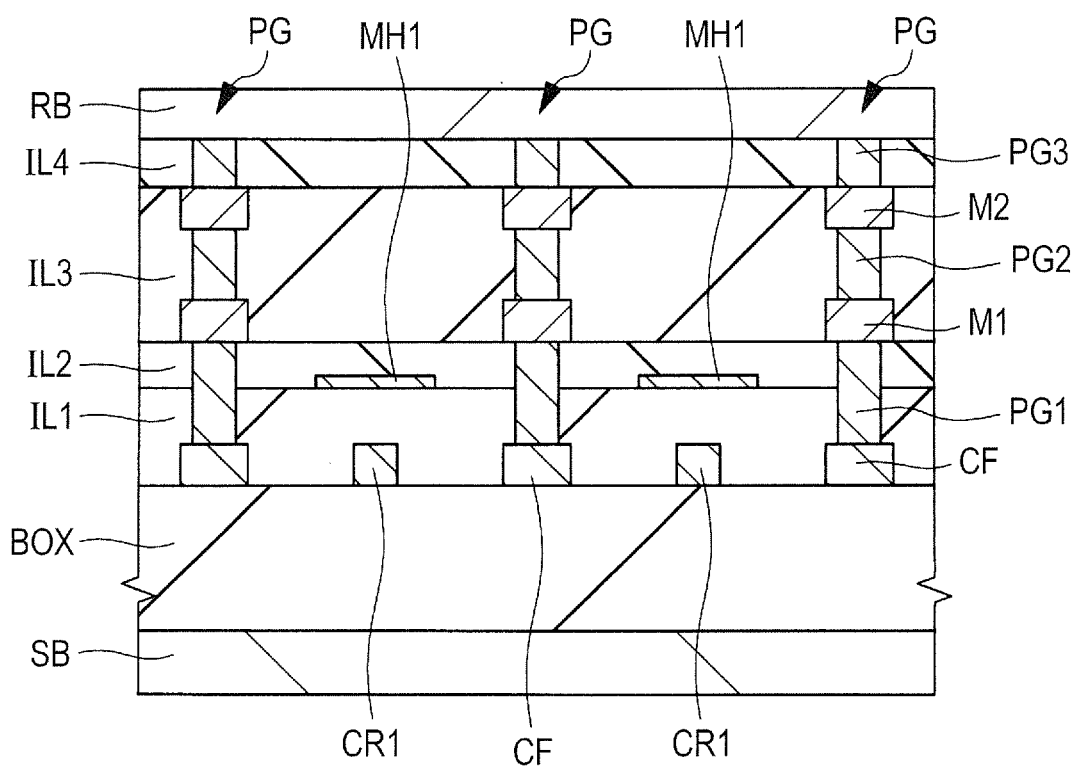
FIG. 10 is a cross-sectional view of the semiconductor device during a manufacturing step following that of FIG. 9.

Next, as shown in FIG. 10, an interlayer insulating film IL4 is formed on the wiring M2 and the interlayer insulating film IL3 by using, for example, CVD. The interlayer insulating film IL4 is made of, for example, a silicon oxide film. Then, a plurality of coupling holes that penetrate the interlayer insulating film IL4 and exposing the upper surface of the wiring M2 is formed using photolithography and dry etching. After that, a metal film is formed on the interlayer insulating film IL4 to completely fill each of the coupling holes therewith. The metal film is mainly made of, for example, W (tungsten) or Cu (copper). The metal film on the interlayer insulating film IL4 is then removed using, for example, CMP to form a plug PG3 made of the metal film left in each of the coupling holes. The semiconductor films CF, the plugs (vias) PG1 to PG3, and the wirings M1 and M2 which are electrically coupled to each other configure a heat conducting portion (electro-conductive portion) PG.

Then, a metal film is formed on the plug PG3 and the interlayer insulating film IL4, for example, by sputtering. The metal film configures a heat radiation plate RB. The heat radiation plate RB is formed to cover the heat conducting portion PG, the heater MH1, and the optical waveguide CR1.

The semiconductor device of the present embodiment can be formed by the above-described steps.

Advantages of the Present Embodiment

Figure 18:
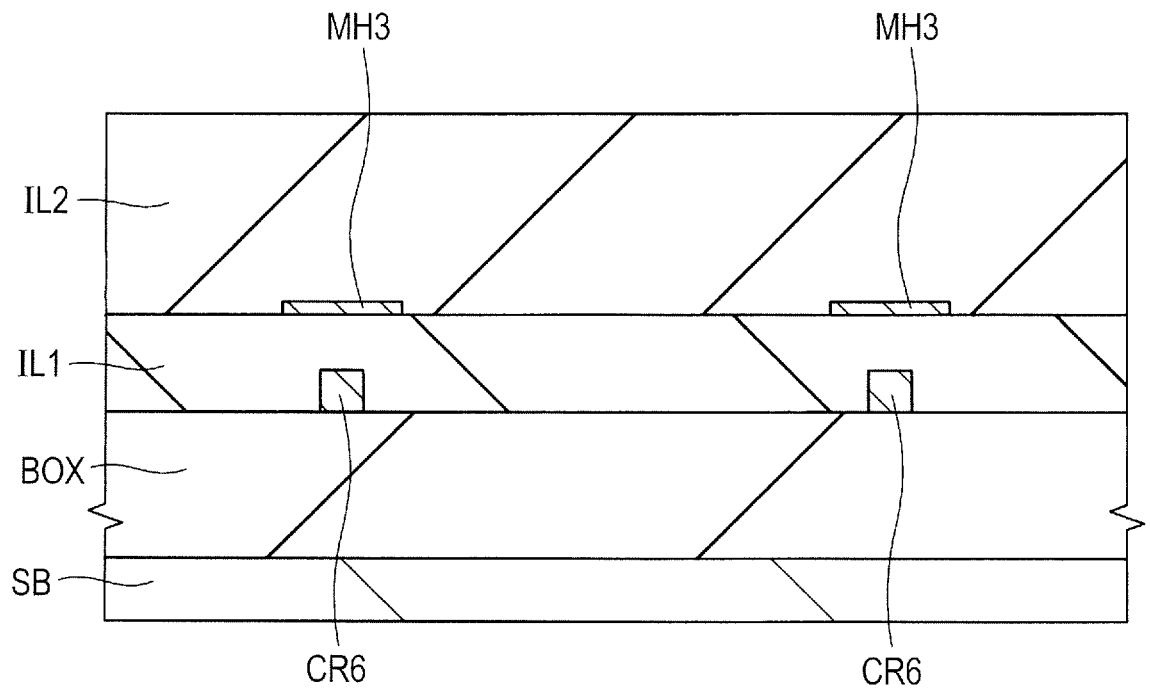
FIG. 18 is a cross-sectional view showing a semiconductor device of Comparative Example.

The advantages of the method of manufacturing the semiconductor device of the present embodiment will hereinafter be described using Comparative Example shown in FIG. 18. FIG. 18 is a cross-sectional view showing a modulator which is a semiconductor device of Comparative Example and shows the cross-section of a portion corresponding to FIG. 3.

During modulation with the modulator, heat of about 100° C., which is applied continuously in the manufacturing steps of a conventional semiconductor device, is applied to the optical waveguide from a resistor (heater). Such heat may deteriorate the interlayer insulating film on the optical waveguide and may crack the interlayer insulating film. The modulator that performs modulation using heat is therefore required to have heat resistance. In order to provide an optical waveguide having improved heat radiation performance, a decrease in the distance between the optical waveguide and an insulating film (BOX) lying therebelow can be considered, but if the optical waveguide is brought into contact with the insulating film, it becomes more difficult to obtain such a modulator having an improved heat radiation property.

In addition, there is a possibility of thermal interference occurring between two or more optical waveguides configuring the modulator, more specifically, between the second optical waveguide and the third optical waveguide parallel to each other, among the above-described first to fourth optical waveguides. The term "thermal interference" as used herein means that, for example, when modulation is performed only in the second optical waveguide by supplying the second optical waveguide with heat and not performed in the third optical waveguide, heat diffuses by heating the heater right above the second optical waveguide to increase the temperature of the third optical waveguide and thereby causes a change in the refractive index of the third optical waveguide. This unintentionally causes a shift in the phase of light passing the third optical waveguide, leading to a problem, that is, a shift of a difference in phase between the light passing the second optical waveguide and the light passing the third optical waveguide from a desired phase difference.

In order to prevent occurrence of modulation at an optical waveguide adjacent to an intended optical waveguide due to such thermal interference, securement of a large distance between two optical waveguides as shown in FIG. 18 can be considered. The structure shown in FIG. 18 is similar to that shown in FIG. 3 except that it has neither the heat conducting portion PG nor the heat radiation plate RB (refer to FIG. 3) and a distance between two optical waveguides CR6 is large. FIG. 18 shows only the interlayer insulating film IL2 on the interlayer insulating film IL1 but the interlayer insulating film IL2 may have thereabove a plurality of interlayer insulating films.

As shown in FIG. 18, it seems that if the optical waveguide CR6 serving as a second optical waveguide and the optical waveguide CR6 serving as a third optical waveguide are separated from each other with a large distance in the second direction, occurrence of the above-described thermal interference can be prevented even when one of the optical waveguides C6 is supplied with heat by heating one of the heaters MH3. In addition, it can be considered that the energy efficiency of thermal modulation can be enhanced by placing only a film made of a material having a low thermal conductivity around the optical waveguide CR6 and the heater MH3 as shown in Comparative Example.

The increase in the distance between the optical waveguides CR6 causes a problem, that is, an increase in the area of the semiconductor device.

In the semiconductor device of the present embodiment, therefore, the heat conducting portion PG penetrating the interlayer insulating films IL1 to IL4 and adjacent to the optical waveguide CR1 is provided. When one of the two heaters MH1 shown in FIG. 3 is heated to supply the optical waveguide CR1 right below the heater MH1 with heat, the heat of the heater MH1, the optical waveguide CR1, the interlayer insulating films IL1 to IL4 around the heater MH1, and the insulating film BOX is therefore dissipated upward via the heat conducting portion PG and the heat radiation plate RB. The heat transmitted to the insulating film BOX is dissipated also to the side of the semiconductor substrate SB. By such heat radiation through the heat conducting portion PG and the heat radiation plate RB, deterioration or breakage such as cracks of the interlayer insulating films IL1 to IL4 due to heat can be prevented. The semiconductor device thus obtained can therefore have improved reliability.

When the refractive index of the optical waveguide CR1 is changed, the heater MH1 can be heated to a higher temperature to increase a thermal response rate. Even if the thermal response rate is increased by applying a large electric current to the heater, the heat can be radiated through the heat conducting portion PG so that another optical waveguide can be prevented from being affected by the heat. In short, the modulator can have an increased operation rate. In addition, the heat conducting portion PG thus provided can shorten the cooling time of the optical waveguide CR1 heated by the modulation operation. This makes it possible to shorten a thermal response time until the refractive index changed by heating restores the refractive index before heating. This means that the modulator can have an increased operation rate.

Here, for example, the response rate can be improved in order of μs (μ second) d. It is presumed that when time required for thermal response is, for example, 15 μs in the semiconductor device of Comparative Example, time required in the semiconductor device of the present embodiment can be reduced to 10 μs. This makes it possible to widen a modulation temperature range by the heater MH1 and the modulator thus obtained has improved controllability. The semiconductor device can therefore have improved performance. Such an increase in the rate of the modulation is effective in the modulator as described in the present embodiment but more effective in a resonator of Second Embodiment described later than in the modulator as described in the present embodiment.

In addition, the heat conducting portion PG thus provided can prevent unintentional occurrence of modulation which will otherwise occur when by heating one of the two heaters MH shown in FIG. 3 to supply the optical waveguide CR1 right below the heater with heat, the other optical waveguide CR1 is heated. In other words, occurrence of thermal interference between these two optical waveguides CR1 can be prevented. Compared with Comparative Example, a distance between these optical waveguides CR1 in the second direction can be made smaller, making it possible to provide a minute semiconductor device.

Here, described above is heat dissipation in the modulation for an intentional phase change which is a main application of an optical modulator. On the other hand, modulation may be performed for correction to prevent an unintentional shift of a phase difference between light passing through the second optical waveguide and light passing through the third optical waveguide due to a small difference in the length between these waveguides at the time when they are joined. The heat conducting portion of the present embodiment may be provided in order to dissipate heat in such modulation. A phase difference of optical signals to be joined is ideally 0 or a desired one, but a relatively small shift in their phases may occur. In this case, prior to joining of optical signals, modulation should be performed to correct the optical phase shift in both or either one of the second optical waveguide and the third optical waveguide. Also when modulation for such correction is performed by heating with a heater, the heat conducting portion of the present embodiment can be used to improve the heat dissipation performance. In Modification Example 1 of First Embodiment described below, the heat conducting portion is provided for thermal modulation performed for such correction.

FIG. 2 shows the layout of columnar (island-like) plugs (vias) PG1 to PG3 configuring the heat conducting portion PG. The plugs PG1 to PG3 may be formed to extend in the first direction in plan view in order to enhance the heat dissipation efficiency. If it is difficult to form a long and deep coupling hole which penetrates the interlayer insulating film, for example, plugs PG1 to PG3 shorter than the heater MH1 may be arranged in the first direction.

Here, stacking of four interlayer insulating films is described. The number of the interlayer insulating films stacked may be smaller or greater than 4. The wirings M1 and M2 may be formed on the interlayer insulating film as the wiring M1 or buried in the upper surface of the interlayer insulating film as the wiring M2. The number of the wirings or plugs configuring the heat conducting portion PG can be changed as needed.

Modification examples of the present embodiment and another embodiment will hereinafter be described. Also in the modification examples and embodiment, a heat conducting portion is placed in the vicinity of an optical waveguide and a heater. It is needless to say that due to such a structure, the semiconductor device thus obtained can have enhanced heat dissipation efficiency and heat resistance and can be provided as a miniaturized one.

Modification Example 1

Figure 11:
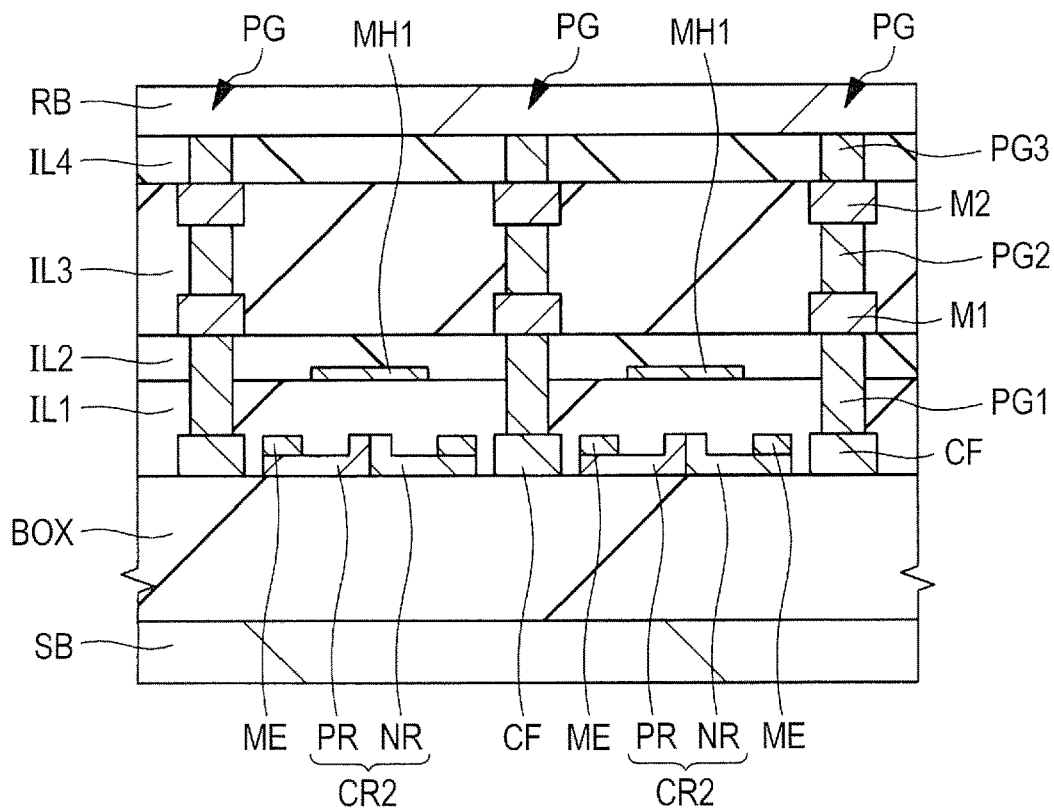
FIG. 11 is a cross-sectional view showing a semiconductor device of Modification Example 1 of First Embodiment of the invention.

FIG. 11 is a cross-sectional view of a semiconductor device of Modification Example 1 of First Embodiment. FIG. 11 is a cross-sectional view of a portion corresponding to that of FIG. 3. Described herein is combined use of a method using a carrier plasma effect and a method using a thermos-optical effect for the modulation operation with a modulator.

As shown in FIG. 11, the structure of the semiconductor device of the present modification example is almost similar to that shown in FIG. 3. The structure shown in FIG. 11 is however different from that shown in FIG. 3 in that an optical waveguide CR2 is comprised of a first portion extending in the second direction along the upper surface of the insulating film BOX and a second portion located on the first portion and having a second-direction width smaller than that of the first portion and that the first portion has an electrode ME coupled to the upper surface of the end portion thereof.

The whole optical waveguide CR2 is made of Si (silicon). At the center of the optical waveguide CR2 in the second direction, the upper surface of the optical waveguide CR2 protrudes upward. This protrusion as the second portion and the optical waveguide CR2 right below serve as a main waveguide which light passes. The optical waveguide CR2 is comprised of a p-type semiconductor region PR and an n-type semiconductor region NR and an interface between these semiconductor regions is at the center in the second direction. This means that the optical waveguide CR2 has therein the p-type semiconductor region PR and the n-type semiconductor region NR arranged in the second direction. Although the p-type semiconductor region PR and the n-type semiconductor region NR may be in contact with each other, an intrinsic semiconductor layer having a low impurity concentration and belonging to neither a p-type nor an n-type may be formed in the optical waveguide CR2 between the p-type semiconductor region PR and the n-type semiconductor region NR. In short, the optical waveguide CR2 may have therein a PIN structure.

At the end portion of the optical waveguide CR2 in the second direction, that is, at the end portion of each of the p-type semiconductor region PR and the n-type semiconductor region NR in the second direction, the electrode ME is coupled to each of the upper surface of the p-type semiconductor region PR and the upper surface of the n-type semiconductor region NR. The electrode ME may be a semiconductor film or a metal film. When the electrode ME is made of a semiconductor, the electrode ME and the optical waveguide CR2 may be present as one body. The electrode ME has an upper surface covered with an interlayer insulating film IL1.

Examples of a method of forming the optical waveguide CR2 of the semiconductor device of the present modification example includes a method of causing two portions of the upper surface of the semiconductor film PS shown in FIG. 4 to retreat to the depth in the semiconductor film PS to thereby form a first portion right below these two trenches and a second portion (a protrusion) between these trenches and then removing a portion of the semiconductor film PS outside the first portion and the second portion to expose the insulating film BOX.

Here, modulation for an intentional phase change which is the main application of an optical modulator, that is, modulation for changing a signal "0" to a signal "1" is performed by a method using a carrier plasma effect. Described specifically, in either the second optical waveguide or the third optical waveguide, a positive potential is applied to the n-type semiconductor region NR and, for example, 0 or negative potential is applied to the p-type semiconductor region PR via the electrode ME. This generates a potential difference in the optical waveguide CR2 and a depletion layer appears in the optical waveguide CR2 in the vicinity of the second portion (protruding portion). This causes a change in the refractive index in the optical waveguide CR2 in the vicinity of the second portion (protruding portion) changes and thus, modulation is performed.

Even after the above-described modulation making use of a carrier plasma effect is performed, there may occur an unintentional shift of a difference in phase between light passing the second optical waveguide and light passing the third optical waveguide when they are joined. Modulation for correcting such a shift is performed by supplying the optical waveguide CR2 with heat from the heater MH1. It can correct the shift of the phase of light. By using the heat conducting portion PG of the present embodiment when such modulation for correction is performed by heating with the heater MH1, an advantage similar to that of the embodiment described referring to FIGS. 1 to 10 can be achieved.

When the optical waveguide has therein a PIN structure, modulation is performed by turning ON between the p-type semiconductor region and the n-type semiconductor region.

Modification Example 2

Figure 12:
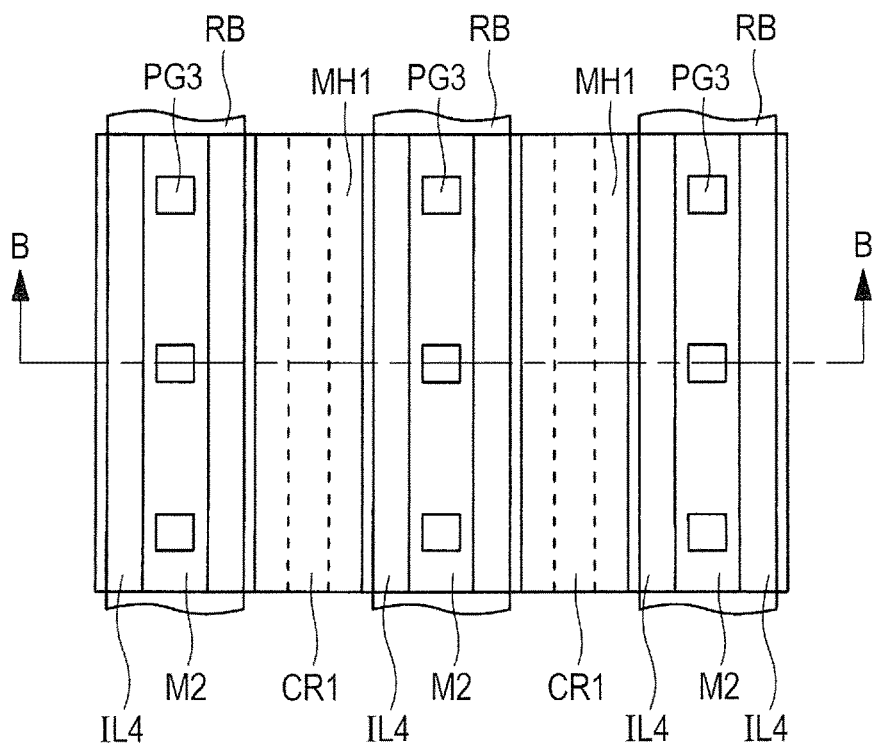
FIG. 12 is a plan view showing a semiconductor device of Modification Example 2 of First Embodiment of the invention.
Figure 13:
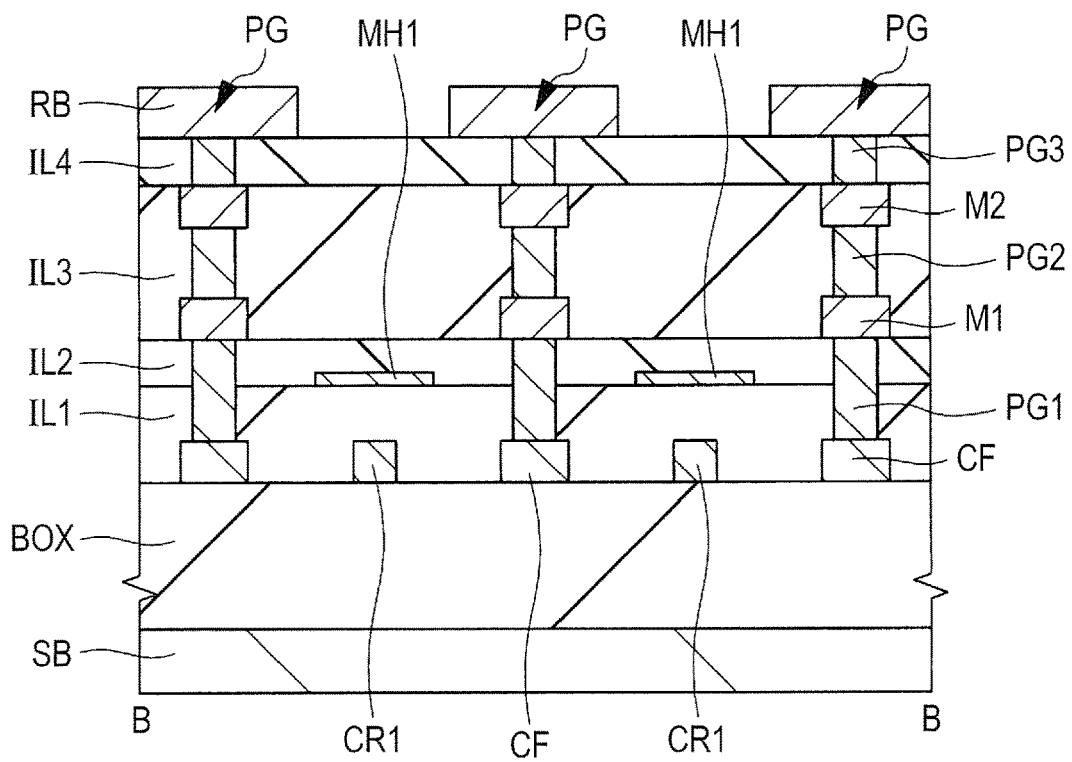
FIG. 13 is a cross-sectional view taken along the line B-B of FIG. 2.

FIG. 12 is a plan view of a semiconductor device of Modification Example 2 of First Embodiment and FIG. 13 is a cross-sectional view of the semiconductor device of Modification Example 2 of the present embodiment. FIG. 12 is a plan view of a portion corresponding to that of FIG. 2. FIG. 13 is a cross-sectional view of a portion corresponding to that of FIG. 3 and shows a cross-section taken along the line B-B of FIG. 12. In this example, described is formation of heat radiation plates in stripes in the upper portion of a modulator to facilitate temperature observation of a heater. FIG. 2 does not include the heat radiation plate RB, but FIG. 12 includes the heat radiation plate RB.

As shown in FIGS. 12 and 13, the structure of the semiconductor device of the present modification example is almost similar to that shown in FIGS. 2 and 3 except that the heat radiation plates RB in the structure of the present modification example have a stripe-like layout in which their patterns extending in the first direction in plan view are arranged. Here, the radiation plates RB are each buried in a trench formed on the upper surface of the interlayer insulating film IL4. The radiation plates RB are arranged in the second direction and are coupled to the upper surface of the plugs PG3, respectively. In addition, the heat radiation plates RB expose the heater MH1 and the optical waveguide CR1 in plan view. In other words, the heat radiation plates RB do not overlap with the heater MH1 in plan view.

Since the heat radiation plates RB do not cover the entire upper surface of the modulator, the heater MH1 can easily be observed from above the modulator. This makes it possible to obtain an effect of easily measuring the temperature of the heater MH1.

Modification Example 3

Figure 14:
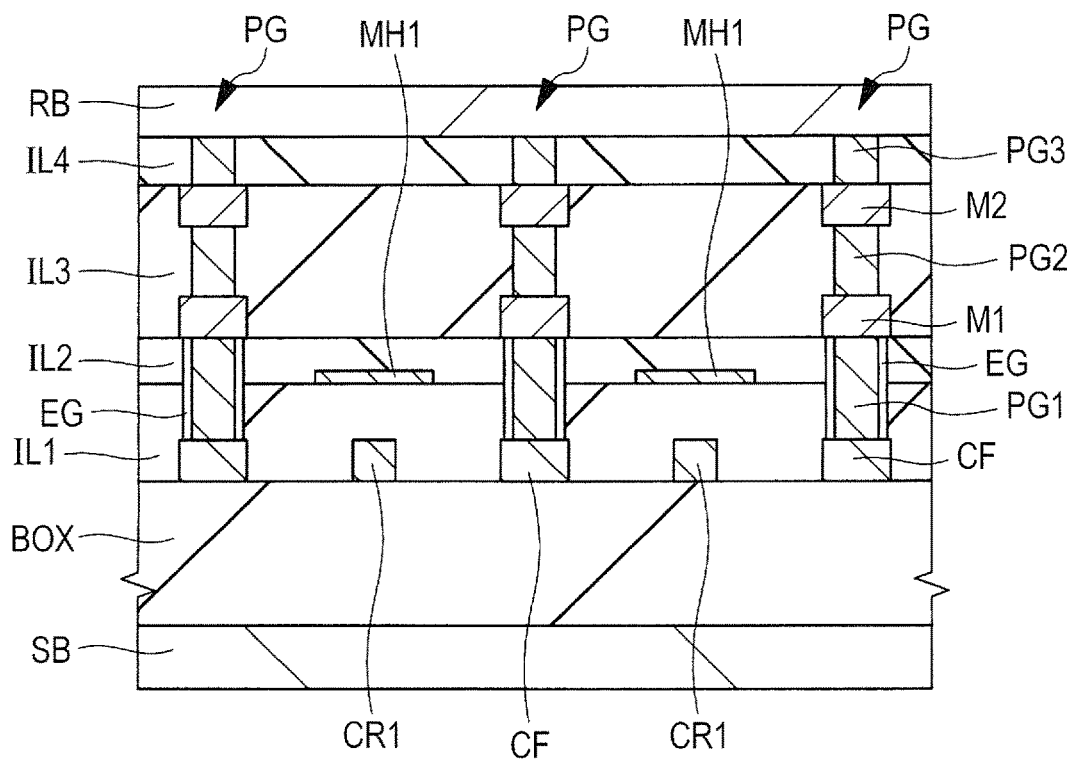
FIG. 14 is a cross-sectional view showing a semiconductor device of Modification Example 3 of First Embodiment of the invention.

FIG. 14 is a cross-sectional view of a semiconductor device of Modification Example 3 of First Embodiment.

FIG. 14 is a cross-sectional view of a portion corresponding to that of FIG. 3. In the present modification example, described is provision of a region having a thermal conductivity lower than that of silicon oxide between a heat conducting portion and an interlayer insulating film.

As shown in FIG. 14, the structure of the semiconductor device of the present modification example is almost similar to that shown in FIG. 3 except that the plug PG1 and the interlayer insulating films IL1 and IL2 have therebetween a void EG. The void EG as a whole is formed at a position overlapping, in plan view, with the semiconductor film CF and the wirings M1 and M2 having a horizontal width larger than that of the plug PG1. This means that in the horizontal direction along the upper surface of the insulating film BOX, the void EG terminates inside the respective end portions of the semiconductor film CF and the wirings M1 and M2. The void EG covers the side surface of the plug PG1 and surrounds the plug PG1 in plan view. Since the plug PG1 and the interlayer insulating films IL1 and IL2 have therebetween the void EG, the plug PG1 is not in contact with the interlayer insulating films IL1 and IL2. At least the heater MH1 and the plug PG1 adjacent to each other have therebetween the void EG.

The void EG has therein neither an insulating film nor an electro-conductive film. A region having therein a void EG is a region having a thermal conductivity lower than that of a material (for example, silicon oxide) configuring the interlayer insulating films IL1 to IL4. Compared with the case where the plug PG1 is in contact with the interlayer insulating films IL1 and IL2, therefore, the heat of the heater MH1 heated for modulation cannot easily be transferred to the heat conducting portion PG including the plug PG1. This means that the heat of the heater MH1 is preferentially transferred to the optical waveguide CR1. Even if the modulation operation is performed while setting the heating temperature of the heater MH1 low, the refractive index of the optical waveguide CR1 can be changed to a desired one and modulation can therefore be achieved. This enables the power consumption of the heater MH1 to reduce, for example, by several tens of mW. In short, the semiconductor device can be driven at reduced power consumption.

In addition, even if the heat conducting portion PG is brought close to the optical waveguide CR1 in the second direction, the presence of the void EG having a thermal conductivity lower than that of the interlayer insulating films IL1 to IL4 makes it possible to prevent insufficient heating of the optical waveguide CR1 which will otherwise be caused by the excessive release of the heat of the heater MH1 via the thermal conducting portion PG. By forming the void EG to bring the heat conducting portion PG close to the optical waveguide CR1 in the second direction, a miniaturized semiconductor device can be provided. For example, the distance between the heater MH1 and the plug PG1 can be made smaller than 1 μm.

The above-described advantage can be obtained only by forming the void EG between the heater MH1 and a portion of the heat conducting portion PG (for example, the plug PG1) so that the void EG may be formed in the interlayer insulating films IL1 and IL2 between the heater MH1 and the plug PG1 without bringing the void EG into contact with the plug PG1.

Modification Example 4

Figure 15:
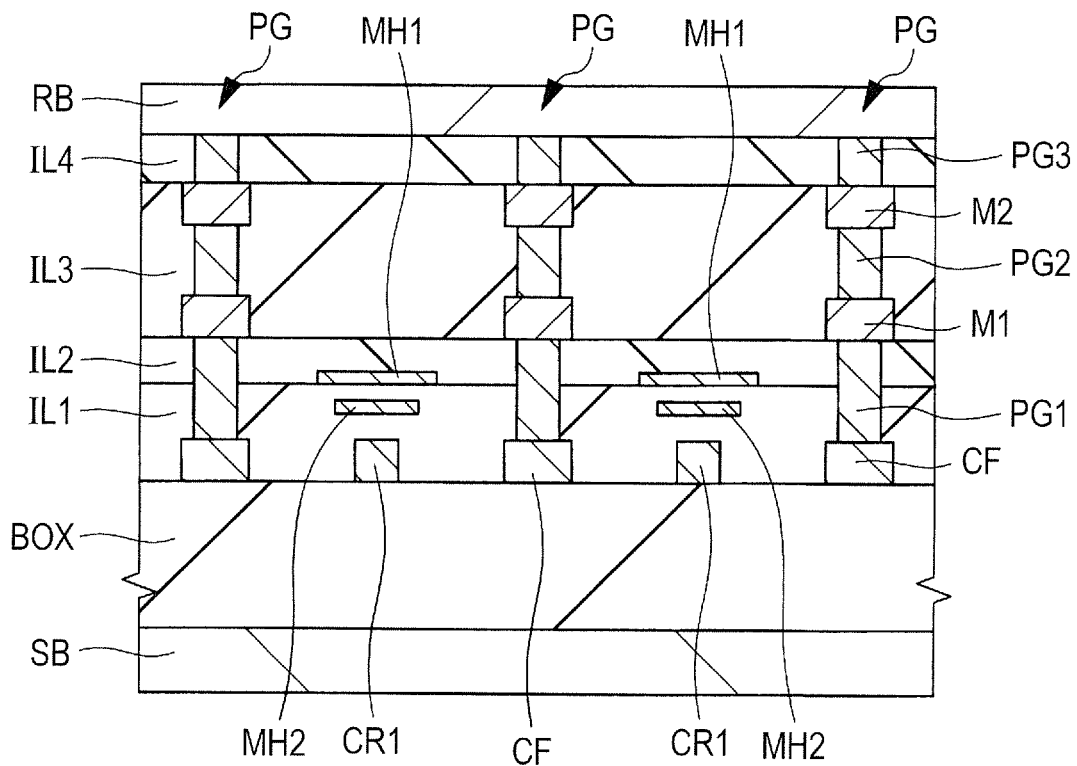
FIG. 15 is a cross-sectional view showing a semiconductor device of Modification Example 4 of First Embodiment of the invention.

FIG. 15 is a cross-sectional view of the semiconductor device of Modification Example 4 of the present embodiment. FIG. 15 is a cross-sectional view of a portion corresponding to that of FIG. 3. In the present modification example, described is provision, between a heater and an optical waveguide, of a second heater (resistor) to control the flow of the heat.

As shown in FIG. 15, the structure of the semiconductor device of the present modification example is almost similar to that shown in FIG. 3. The structure shown in FIG. 15 is different from that shown in FIG. 3 in that the heater MH1 and the optical waveguide CR1 have therebetween a heater MH2. The heater MH2 is separated from the heater MH1 and also from the optical waveguide CR1 via the interlayer insulating film IL1. The width of the heater MH2 in the second direction is smaller than the width of the heater MH1 in the second direction and is greater than the width of the optical waveguide CR1 in the second direction. In plan view, the heaters MH1 and MH2 and the optical waveguide CR1 overlap with one another and the heater MH2, similar to the heater MH1, extends in the first direction.

Here, the interlayer insulating film IL1 has therein the heater MH2, but in practice, similar to the heater MH1, the heater MH2 is located between two stacked interlayer insulating films configuring the interlayer insulating film ILL This means that the heater MH2 can be formed in a manner similar to that of the heater MH1. The heater MH2 is made of, for example, Ti (titanium), TiN (titanium nitride) or the like. The heater MH2 is positioned at a height between the upper and lower surfaces of the plug PG1 and is adjacent to the plug PG1 in the second direction. The heater MH2 is, similar to the heater MH1, a heat conducting portion which can be heated by applying an electric current thereto. Here, the distance between the heater MH1 and the heater MH2 is smaller than the distance (a).

In the present example, the heater MH2 is formed between the heater MH1 and the optical waveguide CR1 so that the flow of the heat spread from the heater MH1 can be controlled to gather toward the forming direction of the heater MH2, that is, the lower direction on the side where the optical waveguide CR1 is formed. This makes it possible to prevent excessive transfer of the heat of the heater MH1 to the optical waveguide CR1 and to supply the optical waveguide CR1 with heat efficiently. The distance between the heater MH1 and the plug PG1 can therefore be reduced.

Modification Example 5

Figure 16:
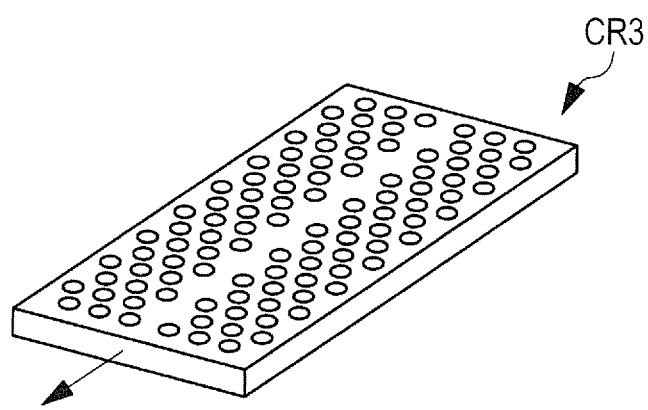
FIG. 16 is a perspective view showing a semiconductor device of Modification Example 5 of First Embodiment of the invention.

FIG. 16 is a perspective view of an optical waveguide configuring a semiconductor device of Modification Example 5 of First Embodiment. In the present modification example, use of a photonic crystal for an optical waveguide is described.

The structure of the semiconductor device of the present modification example is almost similar to that shown in FIG. 3 except that an optical waveguide CR3 is made of a photonic crystal as shown in FIG. 16. The term "photonic crystal" means an optical nanostructure having a periodic refractive index distribution, in particular, a multidimensional periodic structure. The photonic crystal is a structure artificially manufactured to have periodicity almost the same as that of the wavelength of light. The optical waveguide CR3 described herein has a plurality of holes penetrating from the upper surface to the lower surface thereof. In other words, the optical waveguide CR3 has a plurality of through-holes opened and arranged periodically in plan view. Optical signals pass the photonic crystal, for example, in the direction of the arrow shown in FIG. 16.

Light passing through the optical waveguide CR3 made of the photonic crystal has a wavelength shorter and a passing rate lower than those of light passing through a silicon film having none of the through-holes so that the the distance of the optical waveguide CR3 required for modulation can be shortened. In other words, the extending direction of the second optical waveguide and the third optical waveguide can be shortened. This makes it possible to make the heater MH1 power-saving and miniaturize a modulator.

Second Embodiment

In the description of First Embodiment, the heat conducting portion is provided in the vicinity of the optical waveguide configuring the modulator, but the heat conducting portion may be provided in the vicinity of an optical waveguide configuring a resonator which is a silicon photonic device.

Figure 17:
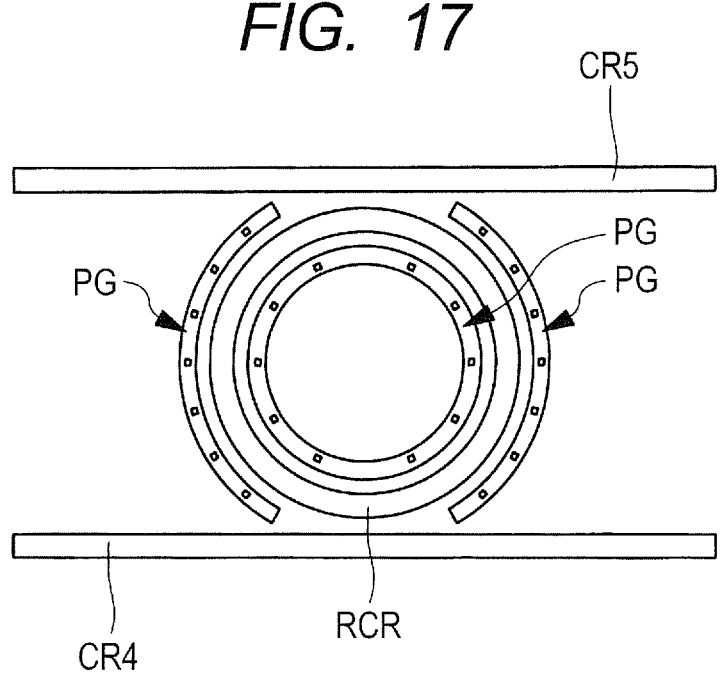
FIG. 17 is a plan view showing a semiconductor device of Second Embodiment of the invention.

FIG. 17 is a plan view of a resonator (optical resonator) which is a semiconductor device of Second Embodiment. The resonator of the present embodiment is a ring optical resonator comprised of optical waveguides CR4 and CR5 extending in parallel to each other in plan view and having a ring optical waveguide PCR arranged between the optical waveguide CR4 and the optical waveguide CR5 and having a ring structure in plan view. The optical waveguides CR4 and CR5 and the ring optical waveguide RCR are separated from one another via an insulating film (not shown). In this device, an optical signal is input from the optical waveguide CR4 and output from the optical waveguide CR5. The shape of the ring optical waveguide RCR in plan view may be either round or oval.

When light is input to the optical waveguide CR4, coupling between a portion of the light passing the optical waveguide CR4 and the ring optical waveguide RCR occurs. More specifically, a portion of light passing through the optical waveguide CR4 penetrates to the ring resonator at a position where the ring optical waveguide RCR and the optical waveguide CR4 are sufficiently close to each other. Light incident in the circular ring optical waveguide PCR has increased intensity by interference after circling round and round in the ring optical waveguide RCR and then, output to the optical waveguide CR5. Only light of some wavelengths causes resonation in the optical waveguide RCR so that the ring optical resonator can be used as a filter.

The resonator of the present embodiment heats the ring optical waveguide PCR with a heater, modulates light passing through the ring optical waveguide RCR and thereby selects the wavelength of light output to the optical waveguide CR5.

The optical waveguides CR4 and CR5 and the ring optical waveguide RCR have the same cross-sectional shape and the same cross-sectional area. The optical waveguides CR4 and CR5 and the ring optical waveguide RCR are each made of, for example, Si (silicon). Similar to the modulator shown in FIG. 3, they are formed on a semiconductor substrate via a buried oxide film and are covered with the interlayer insulating films IL1 to IL4 (refer to FIG. 3). The ring optical waveguide RCR has right thereabove a heater (not shown) similar to the heater MH1 (refer to FIG. 3) for heating the ring optical waveguide PCR and this heater is curved along the layout of the ring optical waveguide PCR. This heater is not necessarily a ring one.

In the short direction of the ring optical waveguide RCR, the ring optical waveguide RCR has, in the vicinity thereof, a plurality of heat conducting portions PG. These heat conducting portions PG are each placed along the side surface of the ring optical waveguide RCR. The heat conducting portions PG are arranged adjacent to the side surface on both sides of the ring optical waveguide RCR. In other words, the heat conducting portions PG are arranged so as to sandwich the ring optical waveguide PCR in the short direction of the ring optical waveguide PCR. Here, shown are two curved heat conducting portions PG extending along the outside side surface of the ring optical waveguide RCR and the ring-shaped heat conducting portion PG extending along the inside side surface of the ring optical waveguide RCR. The interlayer insulating film has thereon a heat radiation plate (not shown) coupled to each of the heat conducting portions PG. The semiconductor device of the present embodiment including the ring optical waveguide RCR, the heat conducting portion PG, and the heater therefore has a cross-sectional structure almost similar to that shown in FIG. 3.

Since light of a desired wavelength is extracted from the light passing through the ring optical waveguide RCR and output from the optical waveguide CR5, modulation in the present embodiment is performed by heating the ring optical waveguide RCR with a heater to change the refractive index in the ring optical waveguide PCR. This means that also in the present embodiment, the semiconductor device can have increased heat dissipation efficiency and heat resistance by placing the heat conducting portion PG in the vicinity of the ring optical waveguide PCR. As a result, the semiconductor device thus provided can have improved performance.

Heat is supplied using a heater so that occurrence of unintentional modulation at the ring optical waveguide RCR, the optical waveguide CR4, or the optical waveguide CR5 can be prevented. The semiconductor device thus provided can therefore have improved reliability. From the standpoint of preventing modulation at the optical waveguide CR4 or CR5, the heat conducting portion PG may be placed in the vicinity of the optical waveguide CR4 or CR5.

The invention made by the present inventors has been described specifically based on some embodiments. It is needless to say that the invention is not limited to these embodiments but can be changed in various ways without departing from the gist of the invention.

For example, the structures of First Embodiment, Second Embodiment, and modification examples of First Embodiment may be used in any combination. For Example, the photonic crystal shown in FIG. 16 may be used for the optical waveguide shown in FIG. 11 or the resonator shown in FIG. 17. The heat radiation plate not overlapping with the heater as shown in FIGS. 12 and 13 may be used in the resonator shown in FIG. 17.

What is claimed is:
1. A semiconductor device comprising:
a first optical waveguide formed over a substrate via a first insulating film and comprised of a first semiconductor film extending in a first direction along an upper surface of the first insulating film;
an interlayer insulating film formed over the first insulating film and covering the first optical waveguide;
a first heater formed in the interlayer insulating film directly above the first optical waveguide while being separated from the first optical waveguide; and
a heat conducting portion adjacent to the first optical waveguide and the first heater via the interlayer insulating film in a second direction orthogonal to the first direction and penetrating the interlayer insulating film from the upper surface to the lower surface thereof,
wherein the heat conducting portion has a thermal conductivity greater than that of the interlayer insulating film and the first insulating film, wherein the heat conducting portion does not configure a circuit, and
wherein the first heater and the heat conducting portion have therebetween a void in the second direction.

2. The semiconductor device according to claim 1,
wherein a first distance between the heat conducting portion and the first heater in the second direction is at least twice as long as a second distance between the first heater and the first optical waveguide in a direction perpendicular to the upper surface of the first insulating film.

3. The semiconductor device according to claim 2,
wherein the first distance is at least 1 µm.

4. The semiconductor device according to claim 1,
wherein light passing through the first optical waveguide is modulated by supplying the first optical waveguide with heat from the first heater.

5. The semiconductor device according to claim 4,
wherein the first optical waveguide has a p-type semiconductor region and an n-type semiconductor region adjacent to each other in the second direction, and
wherein light passing through the first optical waveguide is modulated by supplying each of the p-type semiconductor region and the n-type semiconductor region with electricity.

6. The semiconductor device according to claim 1, further comprising an electro-conductive film formed over the interlayer insulating film and having the heat conducting portion coupled thereto,
wherein the electro-conductive film covers the first heater and the first optical waveguide.

7. The semiconductor device according to claim 1, further comprising an electro-conductive film formed over the interlayer insulating film and having the heat conducting portion coupled thereto,
wherein the electro-conductive film exposes therefrom the first heater and the first optical waveguide.

8. The semiconductor device according to claim 1, further comprising a second heater formed between the first heater and the first optical waveguide and separated from both the first heater and the first optical waveguide,
wherein a width of the second heater in the second direction is smaller than a width of the first heater in the second direction.

9. The semiconductor device according to claim 1,
wherein the first optical waveguide is comprised of a photonic crystal.

10. The semiconductor device according to claim 1, further comprising:
a second optical waveguide formed over the first insulating film while being adjacent to the first optical waveguide in the second direction and comprised of a second semiconductor film extending in the first direction; and
a second heater formed in the interlayer insulating film directly above the second optical waveguide while being separated from the second optical waveguide,
wherein the heat conducting portion is provided between the first optical waveguide and the second optical waveguide in the second direction.

11. The semiconductor device according to claim 1,
wherein the heat conducting portion comprises:
a third semiconductor film formed over the first insulating film while being adjacent to the first optical waveguide in the second direction; and a metal film coupled to an upper surface of the third semiconductor film and penetrating the interlayer insulating film.

12. The semiconductor device according to claim 11, further comprising a second heater formed between the first heater and the first optical waveguide and separated from each of the first heater and the first optical waveguide,
wherein a width of the second heater in the second direction is smaller than a width of the first heater in the second direction.

13. The semiconductor device according to claim 12, further comprising an electro-conductive film formed over the interlayer insulating film and having the heat conducting portion coupled thereto,
wherein the electro-conductive film covers the first heater and the first optical waveguide.

14. The semiconductor device according to claim 12, further comprising an electro-conductive film formed over the interlayer insulating film and having the heat conducting portion coupled thereto,
wherein the electro-conductive film exposes therefrom the first heater and the first optical waveguide.

15. A method of manufacturing a semiconductor device, comprising the steps of:
(a) providing a stacked substrate including a substrate, a first insulating film over the substrate, and a first semiconductor film over the first insulating film;
(b) processing the first semiconductor film to form a first optical waveguide comprised of the first semiconductor film and extending in a first direction which extends along a direction along an upper surface of the first insulating film and a second semiconductor film comprised of the first semiconductor film and separated from and adjacent to the first optical waveguide in a second direction orthogonal to the first direction;
(c) forming a first interlayer insulating film that covers therewith the first optical waveguide and the second semiconductor film over the first insulating film;
(d) forming a first heater extending in the first direction over the first insulating film directly above the first optical wave guide;
(e) forming a second interlayer insulating film that covers the first heater therewith over the first interlayer insulating film; and
(f) forming a metal film penetrating the first interlayer insulating film and the second interlayer insulating film and coupled to an upper surface of the second semiconductor film while being separated from the first optical waveguide and the first heater and thereby forming a heat conducting portion comprised of the second semiconductor film and the metal film,
wherein the heat conducting portion has a thermal conductivity greater than that of the first interlayer insulating film and the second insulating film,
wherein the heat conducting portion does not configure a circuit, and
wherein the first heater and the heat conducting portion have therebetween a void in the second direction.

16. The method of manufacturing a semiconductor device according to claim 15,
wherein a first distance between the heat conducting portion and the first heater in the second direction is at least twice as long as a second distance between the first heater and the first optical waveguide in a direction perpendicular to the upper surface of the first insulating film.

* * * * *